US005787926A

United States Patent [19]

Mukumoto et al.

[11] Patent Number: 5,787,926

[45] Date of Patent: Aug. 4, 1998

[54] OVERLOAD PREVENTIVE DEVICE

[75] Inventors: Eiichi Mukumoto, Takarazuka; Yuuki Nagata, Komatsu, both of Japan

[73] Assignees: Konan Electric Company Limited, Hyogo; Komatsu Industries Corp., Tokyo, both of Japan

[21] Appl. No.: 560,116

[22] Filed: Nov. 17, 1995

[30] Foreign Application Priority Data

Feb. 13, 1995 [JP] Japan .................................... 7-023555

[51] Int. Cl.$^6$ .................................................. F16K 17/02

[52] U.S. Cl. ........................................ 137/514.7; 251/50

[58] Field of Search .............................. 137/514.7, 514.5, 137/514; 251/50, 52

[56] References Cited

U.S. PATENT DOCUMENTS 2,693,931 11/1954 Leisy et al. .............................. 251/50

3,578,019 5/1971 Turolla ............................ 137/514.7 X 4,530,371 7/1985 Arav .................................... 251/50 X

FOREIGN PATENT DOCUMENTS 63-126700 5/1988 Japan .

312480 3/1991 Japan .

*Primary Examiner*—Kevin Lee

*Attorney, Agent, or Firm*—Birch, Stewart, Kolasch & Birch, LLP

[57] ABSTRACT

An overload preventive device is capable of preventing elevation of preload pressure due to sticking action or break-through load of a hydraulic cylinder of a press machine. A delay valve for opening when the internal pressure of the load detecting circuit is lower than the minimum pressure to be maintained continuously over a specified time is interposed between a hydraulic pump for supplying pressurized oil of a specified pressure to a load detecting circuit.

6 Claims, 16 Drawing Sheets

OVERLOAD PREVENTIVE DEVICE

BACKGROUND OF THE INVENTION

The present invention relates to an overload preventive device, and more particularly to an overload preventive device capable of preventing a preload pressure from elevating due to cylinder sticking action or break-through load.

In particular, it relates to an overload preventive device in a press machine capable of preventing oil pressure elevation in a protector oil chamber due to break-through load caused by a blanking operation of the press machine, eliminating fluctuations of bottom dead center of the press, preventing malfunction of the overload preventive device, and eliminating fluctuations of the gaps between points.

In a machine tool, an overload preventive device for canceling an overload state is used in order to prevent damage to a die and machine mechanisms by an overload occurring in the machining process.

For example, an overload preventive device of a press is shown in FIG. 7, in which working fluid is sucked into a hydraulic pump 103 from an oil tank 101 through an oil feed passage 102, and pressurized oil is supplied from this hydraulic pump 103 into a hydraulic cylinder 109 formed inside of a slide 107 of a press 106 through a load detecting circuit 105, and, when overloaded, the pressurized oil is released into the oil tank 101 through a return oil passage 104 from a relief valve 108 connected to the load detecting circuit 105.

As shown in FIG. 8, the hydraulic pump 103 and relief valve 108 are integrally combined, and the relief valve 108 is designed to change over between a relief of a large flow rate for absorbing an overload, and a relief of a small flow rate for temperature compensation in the case of temperature rise of the pressurized oil.

As shown in FIG. 9 to FIG. 12, the hydraulic pump 103 comprises a drive unit 110 and a pump main body 122, and the drive unit 110 comprises a cylinder 111, a piston 112 inserted therein hermetically so as to be free to move in and out, a differential valve 117 for connecting an intake-exhaust passage 114 communicating with a pressure receiving chamber 113 partitioned at one side of the piston 112 in the cylinder 111 by changing over to an intake port 115 and an exhaust port 116, a pilot valve 120 for connecting a first pressure receiving chamber 118 of the differential valve 117 by changing over to the intake port 115 and exhaust port 116, and a return spring 121 for thrusting the piston 112 in a direction for reducing the volume of the pressure receiving chamber 113. The pilot valve 120 is designed to accompany the piston 112 near the stroke end of the inside and outside of the piston 112.

In the initial state shown in FIG. 9, the piston 112 is pushed by the return spring 121 to the outside stroke end to the position for reducing the pressure receiving chamber 113 to the maximum extent, and the pilot valve 120 is positioned at the outside stroke end. In this initial state, the first pressure receiving chamber 118 communicates with the intake port 115 to be high in pressure, and the differential valve 117 is moved to the outside stroke end due to differential pressure between the atmospheric pressure (and the internal pressure of the second pressure receiving chamber 119 of the differential valve 117) and the internal pressure of the first pressure receiving chamber 118. The pressure receiving chamber 113 of the cylinder 111 and the intake-exhaust passage 114 communicate with the intake port 115 through the second pressure receiving chamber 119 of the differential valve 117.

Consequently, the piston 112 is moved inside by the pressure of the compressed air supplied from the intake port 115 by overcoming the return spring 121, and when the piston 112 comes closer to the inside stroke end more than specified, the pilot valve 120 operates with the piston 112 to move inside until the piston 112 and pilot valve 120 reach their inside stroke end as shown in FIG. 10, and thereby the first pressure receiving chamber 118 of the differential valve 117 communicates with the exhaust port 116.

As a result, the internal pressure of the first pressure receiving chamber 118 of the differential valve 117 becomes equal to atmospheric pressure, and, as shown in FIG. 11, the differential valve 117 moves to the inside stroke end due to the differential pressure between the atmospheric pressure acting on both sides and the internal pressure of the second pressure receiving chamber 119, so that the pressure receiving chamber 113 of the cylinder 111 and the intake-exhaust passage 114 are connected to the exhaust port 116.

In sequence, the piston 112 moves to the outside by means of the return spring 121, and when the piston 112 comes closer to the outside stroke end more than specified, the pilot valve 120 cooperates with the piston 112 to move inside, and when the piston 112 and pilot valve 120 reach their inside stroke end, as shown in FIG. 10, the first pressure receiving chamber 118 of the differential valve 117 communicates with the intake port 115, and the differential valve 117 moves to the outside by the differential pressure of the atmospheric pressure and the internal pressure of the second pressure receiving chamber 119 of the differential valve 117 and the internal pressure of the pressure receiving chamber 118, thereby returning to the state shown in FIG. 9, and the same operation is repeated thereafter unless a load is applied to the pump main body 122 of the piston 112.

As shown in FIG. 9 to FIG. 12, the pump main body 122 comprises a suction port 123 to which an oil feed passage 102 is connected, a pump chamber 125 communicating with the suction port 123 through a suction valve 124, a plunger 126 communicating with the piston 112 to move in and out of the pump chamber 125, a discharge passage 127 for interconnecting the pump chamber 125 with a pressure chamber 130 of the relief valve 108, and a discharge valve 128 placed in the discharge passage 127.

Cooperating with the piston 112, when the plunger 126 moves from the deeply seated state in the pump chamber 125 to an outgoing direction, the internal pressure in the pump chamber 125 drops, the discharge valve 128 closes, the suction valve 124 opens, differential fluid flows into the pump chamber 125, the plunger 126 moves from the position withdrawn from the pump chamber 125 into the deeply seated direction, if the internal pressure of the pressure chamber 130 of the relief valve 108 is lower than the discharge pressure, the suction valve 124 closes and discharge valve 128 opens, so that the pressure oil is sent from the pump chamber 125 into the pressure chamber 130 of the relief valve 108 through the discharge passage 127.

When the internal pressure of the pressure chamber 130 of the relief valve 108 builds up over a specific preload pressure, the discharge valve 128 is closed, and pressurized oil at a slightly higher pressure than the preload pressure is sealed in the pump chamber 125, and the piston 112 stops at a position where the internal pressure of the pump chamber 125, the elastic force of the return spring 121, and the internal pressure of the pressure receiving chamber 113 are balanced.

Afterwards, for example, a small amount of pressurized oil is discharged from the relief valve 108 for temperature compensation, and the press 106 is stopped in this state. The press 106 starts again after the oil temperature drops, or due to some other reason, the internal pressure of the pressure chamber 130 of the relief valve 108 becomes a negative pressure lower than the preload pressure which is the minimum pressure to be maintained.

In such a case, the discharge valve 128 opens, pressurized oil is supplied into the pressure chamber 130 from the pump chamber 125 through the discharge passage 127, and the piston 112 moves to the inside, corresponding to the decline of the internal pressure of the pump chamber 125. When the internal pressure of the pressure chamber 130 does not recover to the preload pressure if the piston 112 moves to the outside stroke end, the drive unit 110 further operates, and the pump main body 122 is driven, and pressurized oil is supplied into the pressure chamber 130.

The pressure chamber 130 of the relief valve 108 communicates with the load detecting circuit 105 through the load port 129, and the internal pressure of the pressure chamber 130 increases or decreases depending on the increase or decrease of the press load. When an overload occurs, the relief valve 108 opens, and massive pressurized oil instantly escapes into the return oil passage 104, thereby canceling the overload momentarily.

To prevent the recurrence of an overload by analyzing the cause of the onset of the overload, large flow rate relief action of the relief valve 108 is detected simultaneously with cancellation of the overload to stop the press, and the supply of compressed air into the intake port 115 is also stopped.

In a conventional press machine, as shown in FIG. 13, a protector oil chamber 213 is positioned between the slide 201 and a disk-shaped ram 204. Above the ram 204 is provided a screw 203 having a slide adjusting mechanism for vertically adjusting the slide 201 while transmitting a force. The screw 203 is engaged with a plunger 210, and moves up and down by driving a worm wheel 208. A worm holder 202 is fixed to the slide 201, and the slide 201 is lifted by a balance cylinder 255.

The protector oil chamber 213 communicates with an overload protector device 206 through an oil passage 246, and the overload protector device 206 communicates with an oil tank 207.

Reference numeral 205 denotes a protector valve mounting base, 209 is a slide adjusting motor, and 256 is an air tank.

The overload protector device 206 sucks working fluid from the oil tank 207, and sends pressurized oil into a protector oil chamber 213 beneath the ram 204.

A force generated in the crank motion is transmitted to the ram 204, and this ram 204 has its upper surface contacting a screw 203, and transmits the force to the slide 201 through the pressurized oil in the protector oil chamber 213. Also driving the worm wheel 208, when the screw 203 is rotated and lowered, the slide 201 also descends, or when the screw 203 is rotated and raised, the slide 201 also goes up.

When a preload pressure is applied initially when pressurized oil is supplied to the protector oil chamber 213, as shown in FIG. 14, the protector oil chamber 213 is swollen, and the ram 204 is warped, and the lower surface of the worm holder 202 abuts against the upper surface of the end of the ram 204, and a clearance δ, is formed between the upper surface of the flange 245 of the screw 203 and the lower surface of the worm holder 202. At this time, the pressure of the protector oil chamber 213 is supposed to be $P_1$, and the volume to be $V_1$.

Successively, at the time of press load, a load $F_2$ is generated as shown in FIG. 15, and the lower surface of the worm holder 202 and the upper surface of the end portion of the ram 204 depart from each other, the warp of the ram 204 is cleared, the volume of the protector oil chamber 213 decreases, and the pressure in the protector oil chamber 213 rises. At this time, the pressure of the protector oil chamber 213 is supposed to be $P_2$and the volume to be $V_2$. The pressure $P_2$ is proportional to the load $F_2$.

As further processed and blanked, the load is cleared to be in a break-through state as shown in FIG. 16. The slide 201 moves suddenly downward, the upper part of the flange 245 of the screw 203 contacts the worm holder 202, and a tensile force $F_3$ is created in the screw 203, while the ram 204 is warped, and the slide 201 is pulled downward and the volume of the protector oil chamber 213 is increased, so that the pressure in the protector oil chamber 213 falls. The pressure in the protector oil chamber 213 is lower than in the initial state, thereby becoming in a state below preload pressure $P_1$. At this time, the pressure in the protector oil chamber 213 is supposed to be $P_3$ and the volume to be $V_3$.

The relationship between the protector oil chamber 213 and the press load is shown in FIG. 17.

In FIG. 17, the axis of abscissas denotes the time, and the axis of ordinates represents the oil pressure/press load. The oil pressure waveform in the protector oil chamber 213 is shown by a broken line, and the press load waveform by a solid line.

As the pressure of the protector oil chamber 213, initially, a preload pressure $P_1$ is applied (FIG. 14), and when blanking is performed by the pressure, the oil pressure climbs up, and the oil pressure becomes $P_2$ during press loading (FIG. 15), and when further processing is advanced, the oil pressure becomes $P_3$ upon break-through (FIG. 16).

The oil pressure $P_2$ is higher than the preload pressure $P_1$, and the oil pressure $P_3$ is lower than the preload pressure $P_1$.

After break-through, the oil pressure in the protector oil chamber 213 fluctuates around the preload pressure $P_1$ for 20 to 30 msec, and then settles at the preload pressure $P_1$.

Corresponding to the oil pressure in the protector oil chamber 213, the press load elevates gradually from load 0, and reaches the maximum at the press positive pressure, and the break-through load becomes (−), oscillates between the (+) load and (−) load around load 0 for 20 to 30 msec, and settles at load 0.

By this break-through load, vibrations were caused in the press, and various points were broken.

Moreover, the break-through pressure $P_3$ becomes lower than the preload pressure $P_1$, and hence the protector oil chamber 213 is refilled with pressure, and the preload pressure itself is raised, and as shown in Japanese Utility Model Publication No. 3-12480, the overload preventive device malfunctioned, relieving at less than the overload set load.

As the break-through load measure, as shown in Japanese Utility Model Publication No. 3-12480 or Japanese Patent Publication No. 63-126700, a cylinder chamber or accumulator for pressure adjustment was used between the protector oil chamber of the press and the hydraulic pump, and the pressure rise of the protector oil chamber due to break-through load caused by blanking operation was reduced.

Between the protector oil chamber and hydraulic pump shown in Japanese Utility Model Publication No. 3-12480, when the accumulator, check valve and diaphragm are placed, the hydraulic pump works hardly relative to the break-through load, but the following five disadvantages were obtained: (1) The oil volume increases by the use of the accumulator, and the press rigidity is lowered; (2) Because of the diaphragm, it takes a longer time to reset from onset of overload until it becomes ready to start a press operation; (3) The structure is complicated; (4) The hydraulic pump works hardly, but does work sometimes, and the ram deflection increases due to slight elevation of the preload pressure, and the gap of the points decreases, and seizure may be caused when adjusting the slide; (5) The bottom dead center fluctuates upon press loading as shown below.

The shrinkage of the protector oil chamber is expressed by $\delta_P=(V\Delta P)/(AE)$, and when the entire oil volume V increases, the shrinkage increases, and hence the press rigidity declines. Or, when the preload pressure (initial pressure) $P_o$ rises, $\Delta P$ decreases, and $\delta_P$ fluctuates upon press load, and hence the bottom dead center position fluctuates. where V: entire oil volume $\Delta P$: pressure increment by press load ($\Delta P=F/A-P_o$)

A: sectional area of protector oil chamber $P_o$: preload pressure

E: viscosity index of oil

F: press load

Incidentally, the internal pressure of the load detecting circuit 105 increases or decreases depending on the increase or decrease of the load, but upon break-through when the load decreases suddenly after processing, the hydraulic cylinder 109 is extended suddenly, and the hydraulic cylinder 109 is elongated further excessively due to inertia of the slide 106 or the like and the internal pressure of the load detecting circuit 105 becomes a negative pressure lower than the preload pressure which is the minimum pressure to be maintained, and thereafter it is found to settle at the preload pressure while fluctuating up and below the preload pressure, and at the time of sticking action of the awkward operation of the hydraulic cylinder 109, it is also known that the internal pressure of the load detecting circuit 105 becomes a negative pressure.

In this way, when the internal pressure of the load detecting circuit 105 becomes a negative pressurized, the hydraulic pump 103 operates, pressure oil flows into the pressure chamber 130, the oil volume increases in the hydraulic cylinder 109, load detecting circuit 105 and pressure oil chamber 130, and their internal pressures, that is, the preload pressures increase. Since the increase of preload pressure is accumulated every time the press operation is repeated, and when the press operation is continuously repeated many times, the relief valve 108 may relieve a large flow rate at a load lighter than an overload, thereby leading to malfunction.

Similarly, by using the accumulator as shown in Japanese Utility Model Publication No. 3-12480, it is also known that malfunctions occur as mentioned above.

SUMMARY OF THE INVENTION

In the light of the above circumstances, it is an object of the invention to present an overload preventive device capable of preventing the elevation of preload pressure by cylinder sticking action or break-through load.

The invention, in order to achieve the object, comprises an overload preventive device of a press machine having a hydraulic pump for supplying a pressurized oil of a specified pressure to a load detecting circuit when the internal pressure of the load detecting circuit is below a preload pressure, and stopping the supply of pressurized oil to the load detecting circuit when the internal pressure of the load detecting circuit is over the preload pressure, and a relief valve for releasing the pressurized oil in the load detecting circuit when the internal pressure of the load detecting circuit is over the specified value.

That is, the overload preventive device of the invention interposes a delay valve between the hydraulic pump and load detecting circuit so as to open when the internal pressure of the load detecting circuit is lower than the preload pressure continuously over a specified time.

If the internal pressure of the load detecting circuit becomes a negative load lower than the specified preload pressure or fluctuates above and beneath the preload pressure, when recovering over the specified minimum pressure within a specified time, the delay valve is not opened, and the internal pressure upstream of the delay valve is held over the preload pressure, and the hydraulic pump is not actuated, thereby preventing elevation of the preload pressure due to the addition of pressurized oil from the hydraulic pump into the load detecting circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 16 is a sectional view of a protector oil chamber in break-through.

DETAILED DESCRIPTION OF THE PREFERRED EMBODIMENTS

Figure 1:
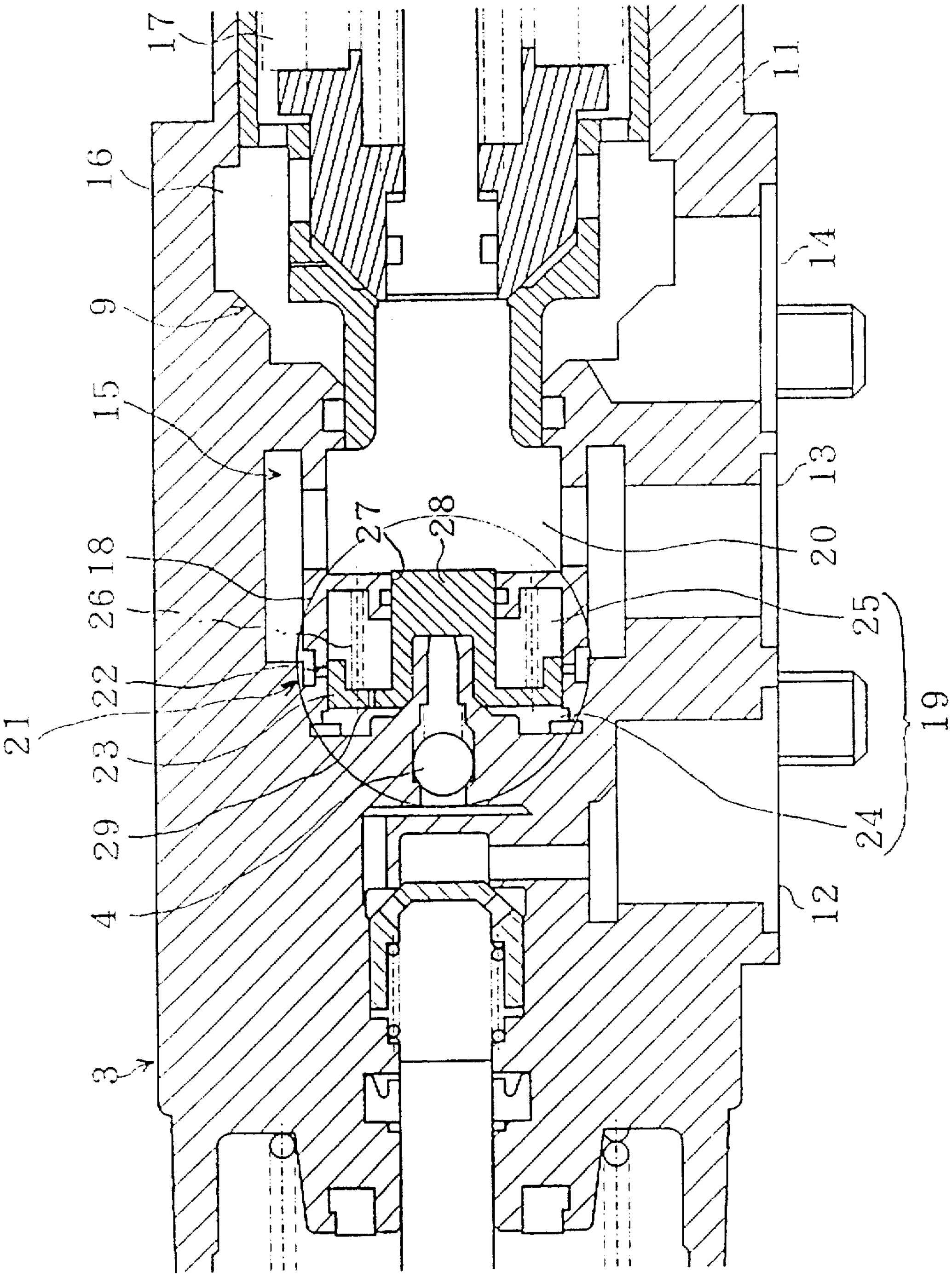
FIG. 1 is a sectional view of a first embodiment of the invention in a first position for stopping the supply of pressurized oil.

Referring now to the drawings, several of embodiments of an overload preventive device of the invention are described in detail below.

Figure 4:
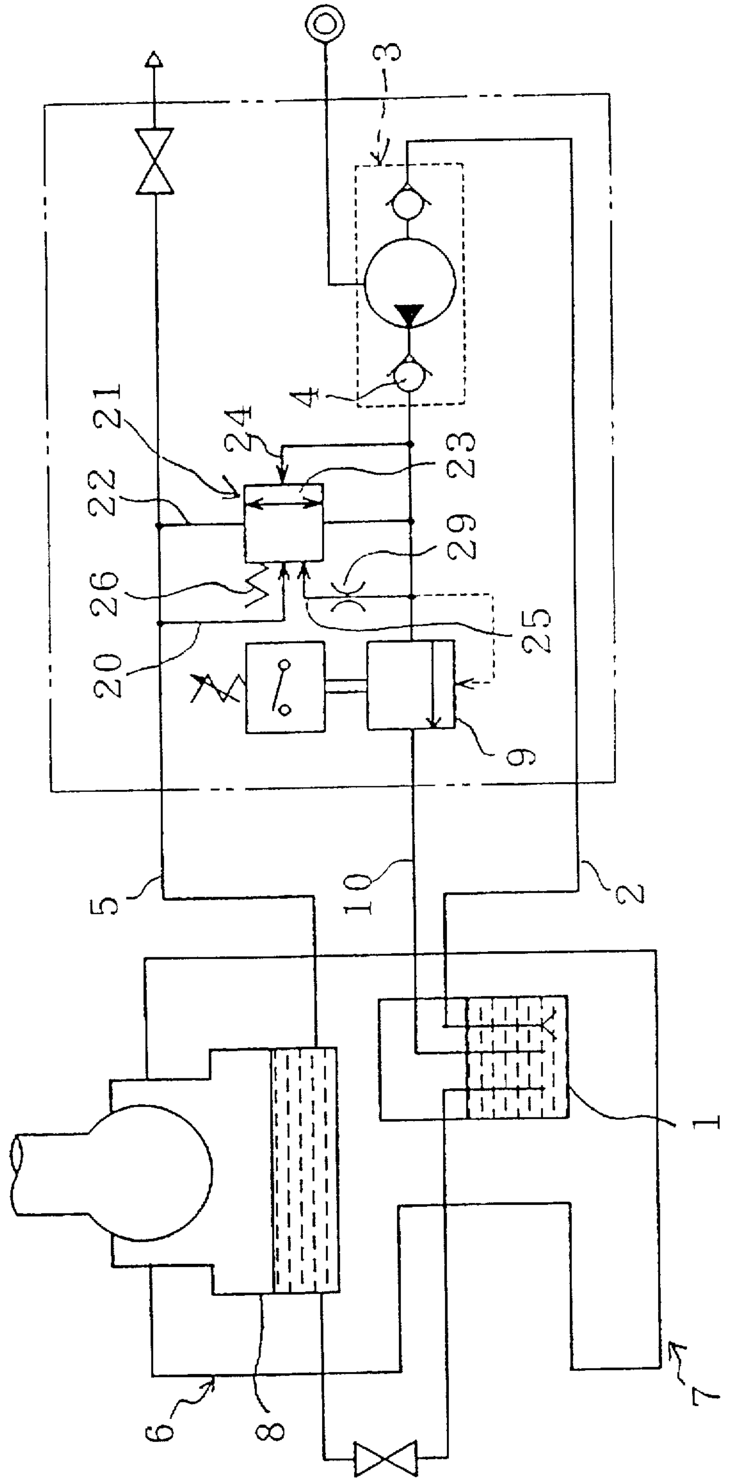
FIG. 4 is a hydraulic circuit diagram of the first embodiment of the invention.

As shown in a circuit diagram in FIG. 4, an overload preventive device in a first an embodiment of the invention sucks working fluid into a hydraulic pump 3 from an oil tank 1 through an oil feed passage 2, supplies pressurized oil into a hydraulic cylinder 8 formed inside of a slide 7 of a press 6 through a load detecting circuit 5 from a discharge valve 4 of the hydraulic pump 3, and, when overloaded, releases a mass of pressurized oil into the oil tank 1 through a return oil passage 10 from a relief valve 9 connected to the load detecting circuit 5, thereby clearing an overload instantly.

Figure 3:
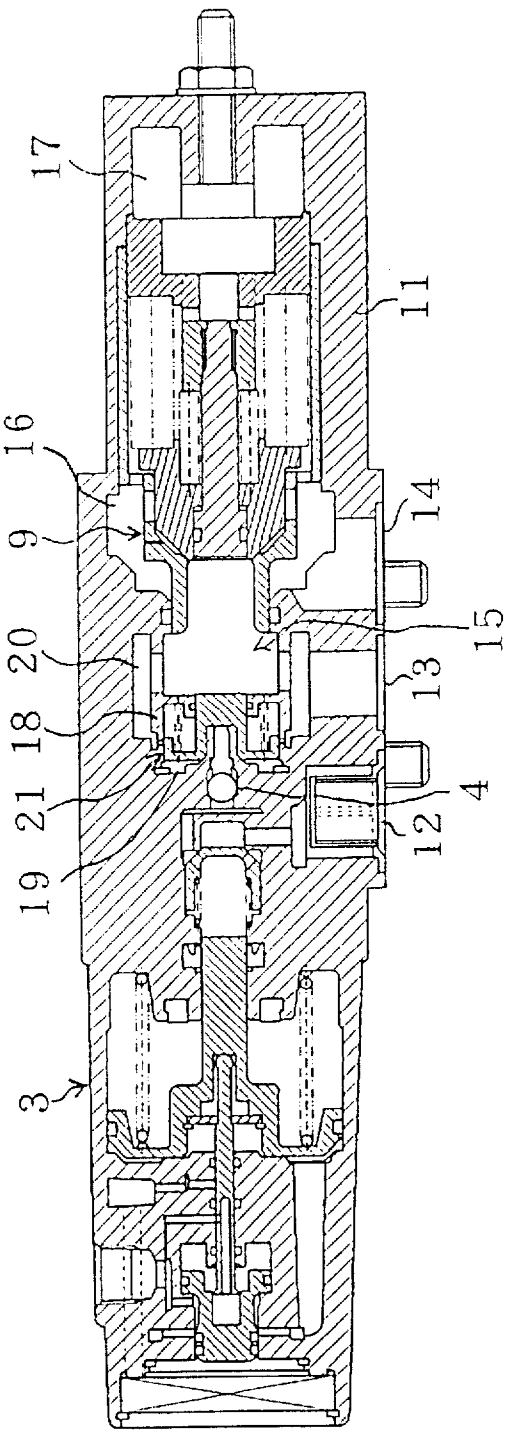
FIG. 3 is a sectional view of the first embodiment of the invention.

As shown in FIG. 3, the hydraulic pump 3 and relief valve 9 are assembled integrally, and a suction port 12 for feeding the working fluid into the hydraulic pump 3, a load port 13 connected to the load circuit, and a return port 14 connected to the relief circuit are opened at one side of a valve case 11 of the relief valve 9, and inside of the valve case 11 are formed a pressure chamber 15 communicating with the load port 13, a valve chamber 16 communicating with the return port 14, being concentrically continuous to the pressure chamber 15, and a pressure setting chamber 17 continuous concentrically to the valve chamber 16.

The pressure chamber 15 is partitioned into an upstream chamber 19 and a downstream chamber 20 communicating with the discharge valve 4 of the hydraulic pump 3 by a cup-shaped partition wall 18 disposed concentrically inside, and a delay valve 21 is placed between the downstream chamber 20 and the discharge valve 4 of the hydraulic pump 3.

Figure 2:
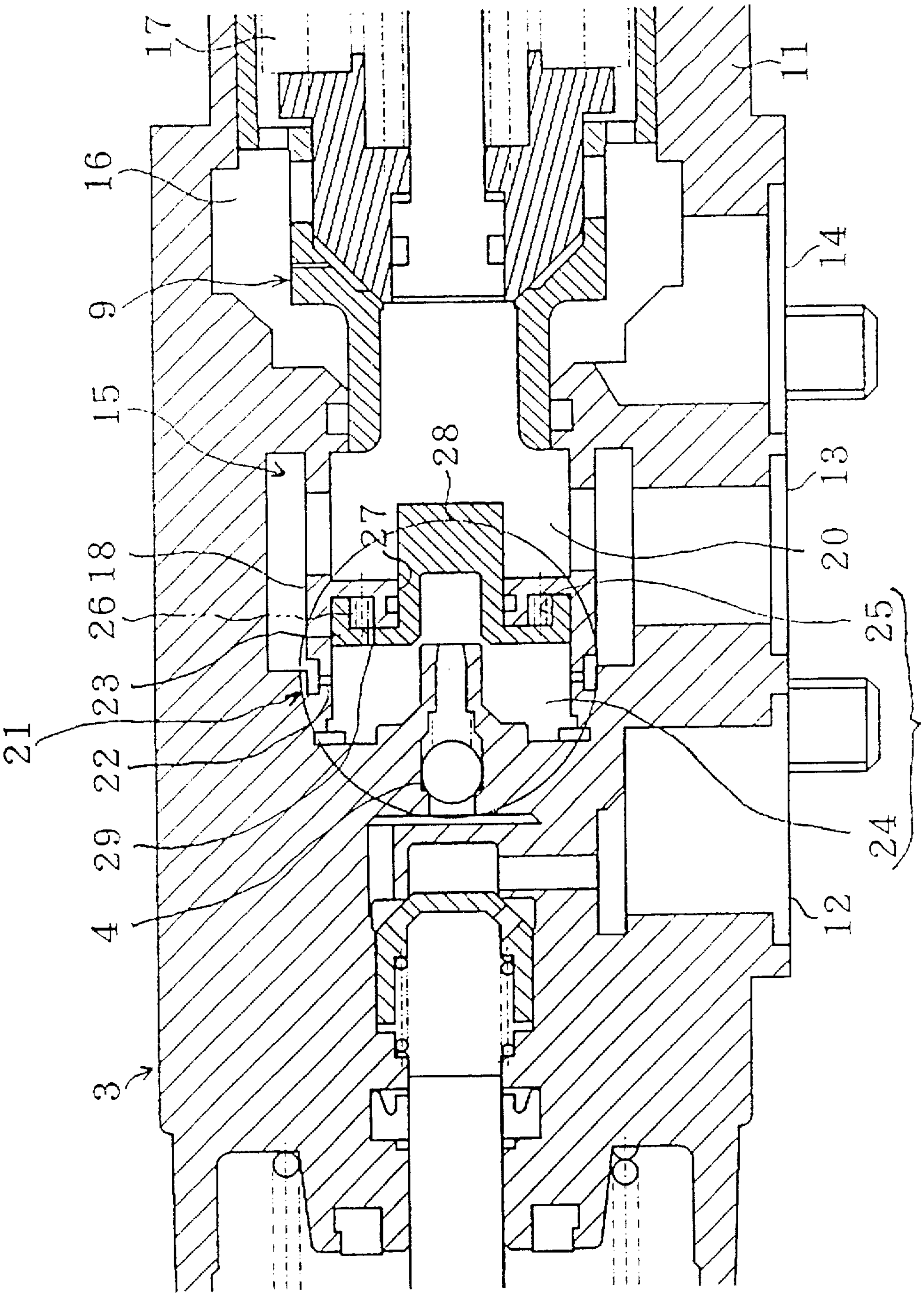
FIG. 2 is a sectional view of the first embodiment of the invention in a second position for supplying pressurized oil.

As shown in FIG. 1 and FIG. 2, this delay valve 21 comprises the upstream chamber 19, a delay passage 22 for communicating between the upstream chamber 19 and downstream chamber 20, and delay valve element 23 for opening and closing the delay passage 22 being retractably inserted in the upstream chamber 19.

This delay valve element 23 divides the upstream chamber 19 into a front chamber 24 communicating with the discharge valve 4 and a rear chamber 25 at the downstream chamber 20 side, and a return spring 26 for thrusting the delay valve element 23 to the front chamber 24 side is inserted in the rear chamber 25.

In the central part of the partition wall 18, a penetration hole 27 is formed, and a piston 28 consecutive to the rear chamber 25 side of the delay valve element 23 is inserted into the penetration hole 27 oil tightly and retractably.

In the delay valve element 23, an orifice 29 for mutually communicating the front chamber 24 and rear chamber 25 is formed, and the forward and backward speed of the delay valve element 23 is limited below a certain level by the flow of oil passing through the orifice 29.

When the overload preventive device stops, the internal pressures of the front chamber 24, rear chamber 25, and downstream chamber 20 are all at the atmospheric pressure (pressure 0), and as shown in FIG. 1, the delay valve element 23 and piston 28 move to the front chamber 24 due to the return spring 26, and the delay passage 22 for communicating between the front chamber 24 and downstream chamber 20 is blocked by the delay valve element 23.

When supplying pressurized oil into the pressure chamber 15 by operating the hydraulic pump 3, the internal pressure of the front chamber 24 is higher than the internal pressure of the downstream chamber 20 until the internal pressure of the downstream chamber 20 reaches the specified preload pressure, and therefore, as shown in FIG. 2, the delay valve element 23 and piston 28 resist the return spring 26 and move to the rear chamber 25 and downstream chamber 20 side to open the delay passage 22 by the differential pressure of the internal pressure of the front chamber 24 and the internal pressure of the rear chamber 25 and downstream chamber 20. As a result, the pressurized oil discharged from the discharge valve 4 of the hydraulic pump 3 into the front chamber 24 flows into the downstream chamber 20 through the delay passage 22, and further fills up the load detecting circuit 5 and hydraulic cylinder 8.

When the internal pressure of the downstream chamber 20, load detecting circuit 5 and hydraulic cylinder 8 exceeds the preload pressure, supply of pressurized oil by the hydraulic pump 3 is stopped, and the differential pressure acting on the delay valve element 23 and piston 28 becomes 0, or a differential pressure acts on the delay valve element 23 and piston 28 in a direction of driving toward the front chamber 24, and thereby, as shown in FIG. 1, the delay valve element 23 and piston 28 move to the front chamber 24 side due to the return spring 26, or, in addition, by differential pressure of the front chamber 24 and the downstream chamber 20, so that the delay passage 22 for communicating the front chamber 24 and the downstream chamber 20 is blocked by the delay valve element 21.

Afterwards, when the internal pressures of the downstream chamber 20, load detecting circuit 5, and hydraulic cylinder 8 becomes a negative pressure lower than the preload pressure which is the minimum pressure to be maintained, a differential pressure acts on the delay valve element 23 and piston 28 so as to move them from the front chamber 24 side to the rear chamber 25 side, but by the diaphragm action of the orifice 29, the moving speed of the pressurized oil in the rear chamber 25 into the front chamber 24 through the orifice 29 is limited, and the delay valve element 23 does not move to the rear chamber 25 side unless the negative pressure state continues over a specified delay time after becoming a negative pressure, and hence the delay passage 22 is not opened.

By properly designing the diameter of piston 28, elastic force of return spring 26, and diameter of orifice 29, when the delay time is set longer than the continuous time of sticking action or break-through load of the hydraulic cylinder 8, if the internal pressures of the hydraulic cylinder, load detecting circuit 8, and downstream chamber 20 becomes negative and fluctuate above and beneath the preload pressure, its effect does not act on the front chamber 24 and the discharge valve 4 of the hydraulic pump 3 communicating therewith, thereby preventing malfunction of the hydraulic pump 3 due to sticking action or break-through load of the hydraulic cylinder, so that the pressurized oil is not discharged into the hydraulic cylinder 8, load detecting circuit 5, and downstream chamber 20, and if press operation is repeated, the preload pressure of the load detecting circuit 5 will not go up. Moreover, elevation of preload pressure of such load detecting circuit 5 can be prevented, and the preload pressure never exceeds the static pressure setting, thereby not leading to malfunction of the relief valve.

The other constitution, action and effect of the embodiment are same as in the conventional load preventive device, and detailed description is omitted.

Figure 5:
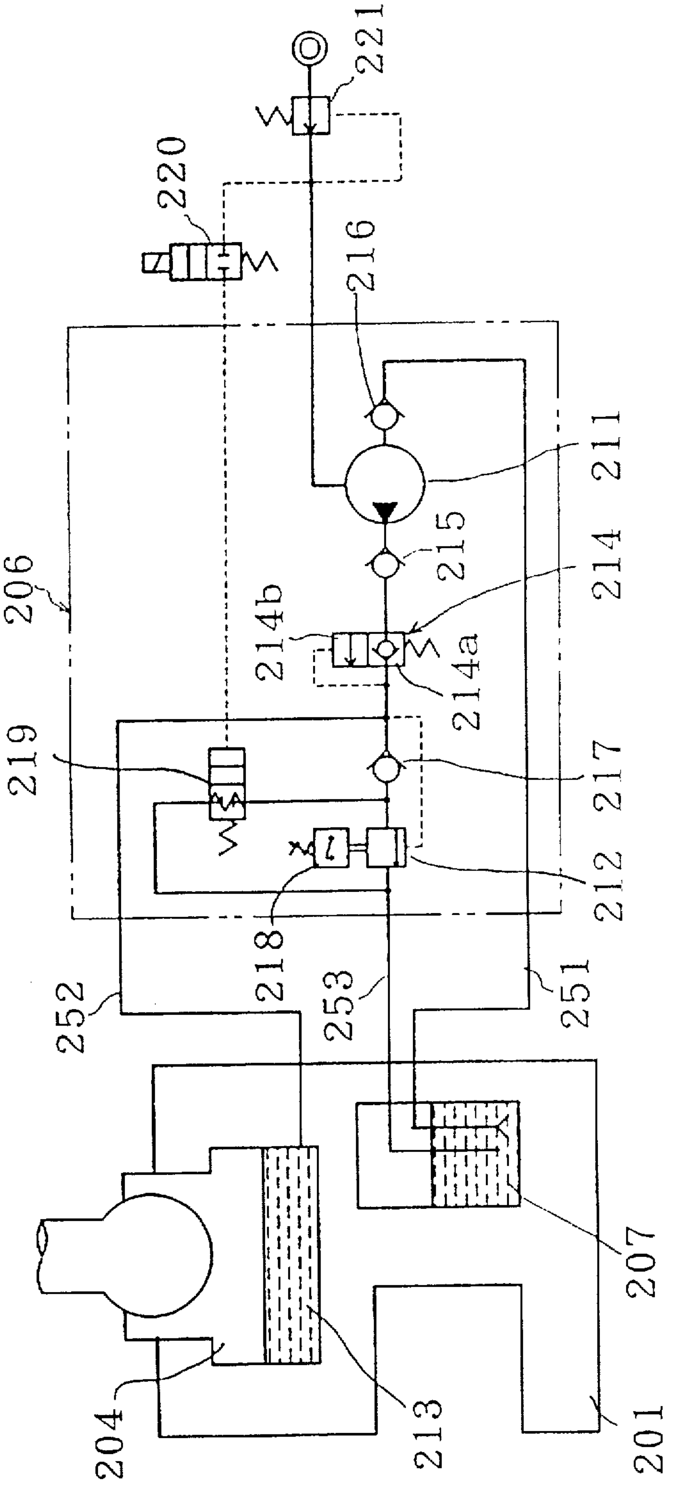
FIG. 5 is a hydraulic circuit diagram of a second embodiment of the invention.
Figure 6:
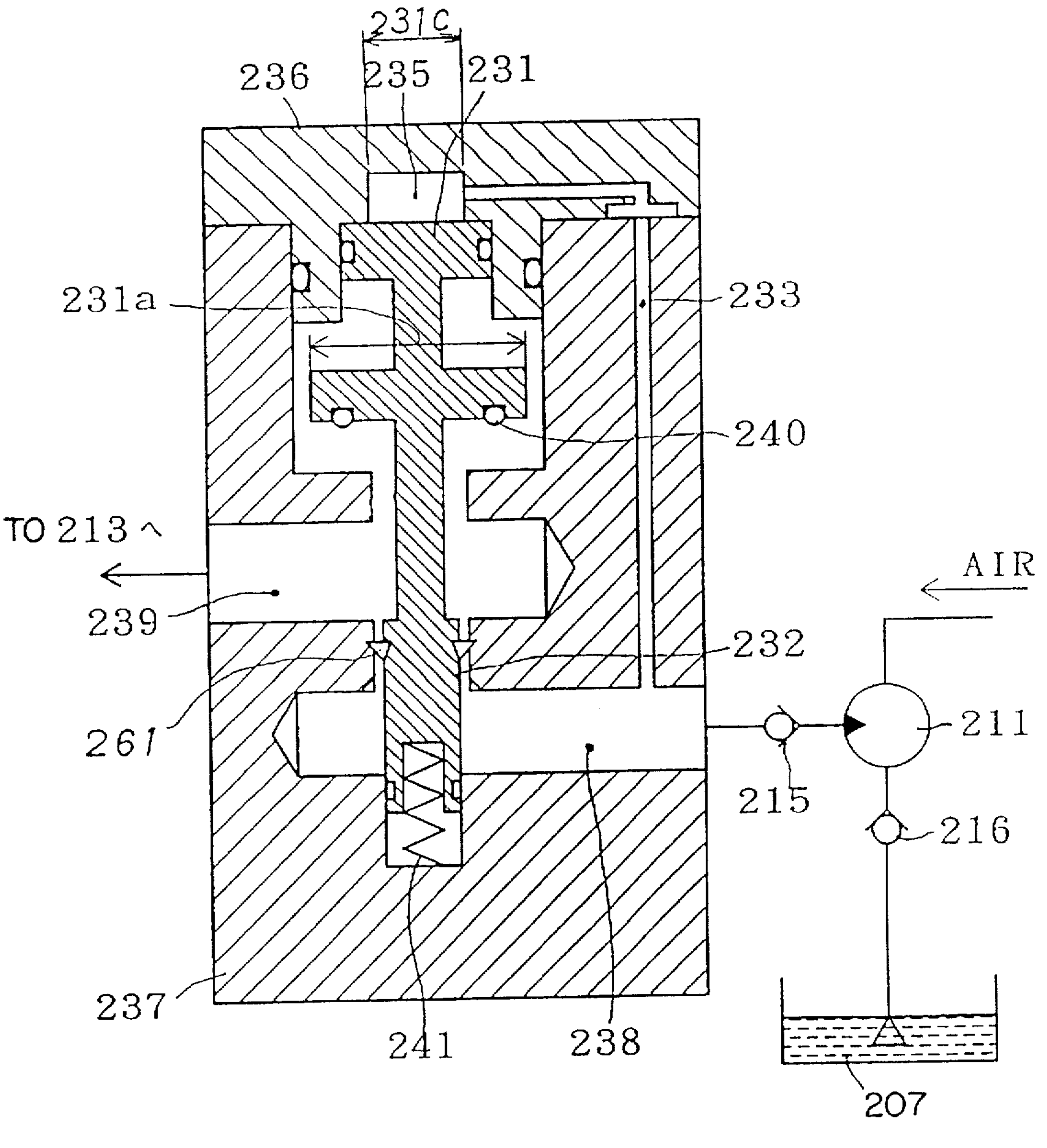
FIG. 6 is a sectional view of a delay valve in the second embodiment of the invention.
Figure 7:
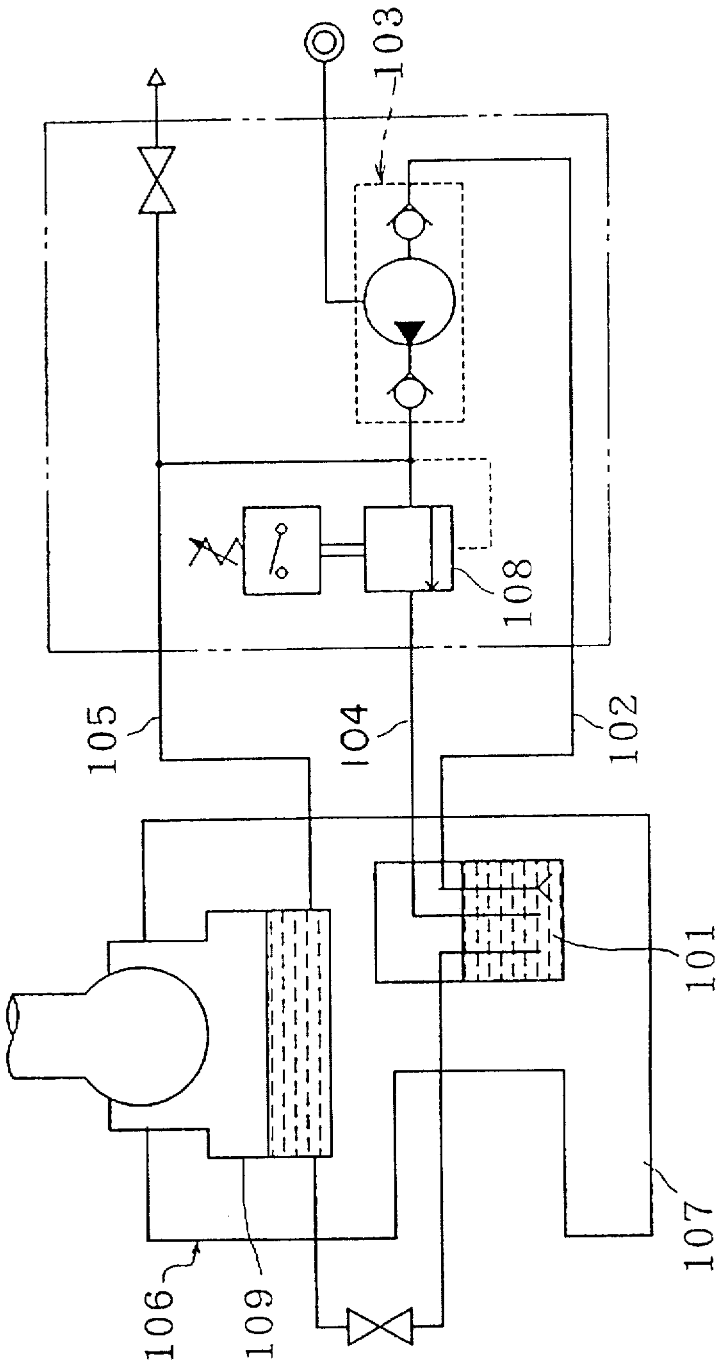
Fig. 7 BACKGROUND ART
FIG. 7 is a hydraulic circuit diagram of an overload safety device of a press.
Figure 8:
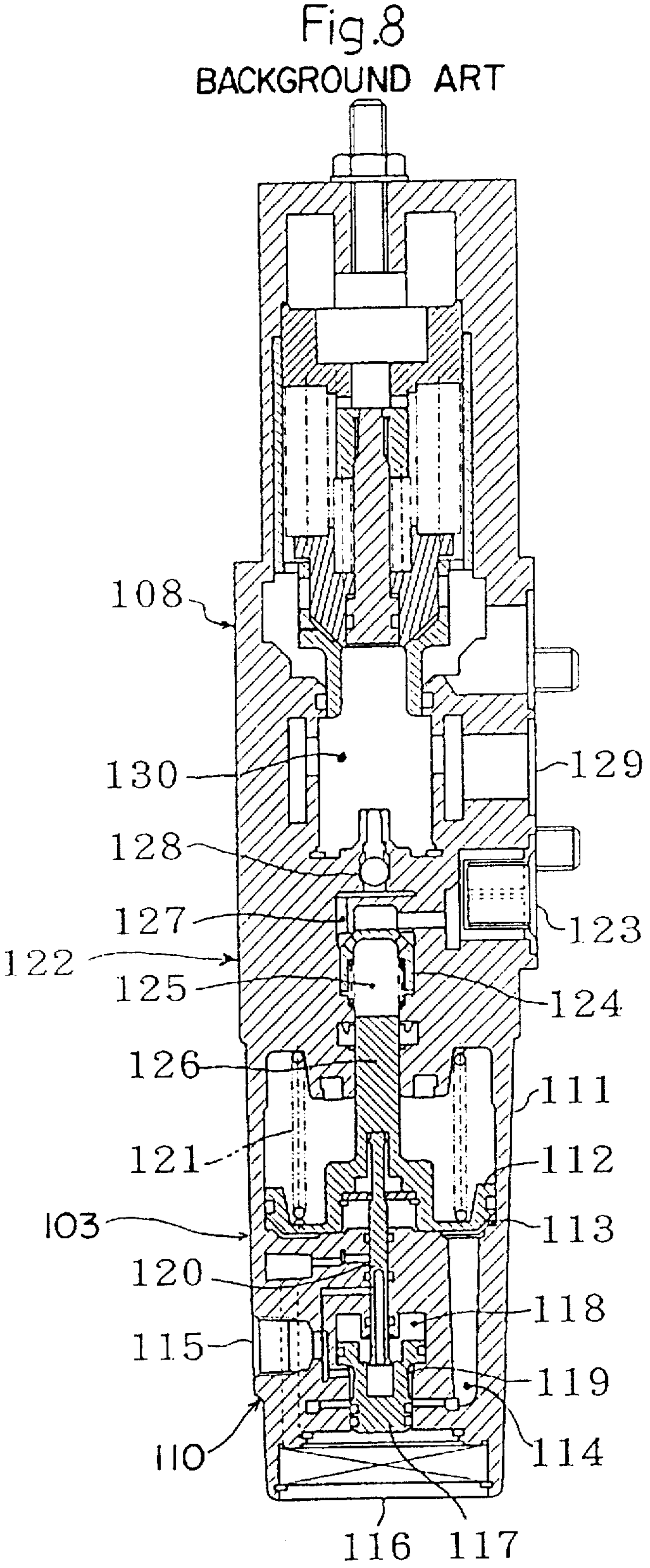
Fig.8 BACKGROUND ART
FIG. 8 is a sectional view of a background art device.
Figure 9:
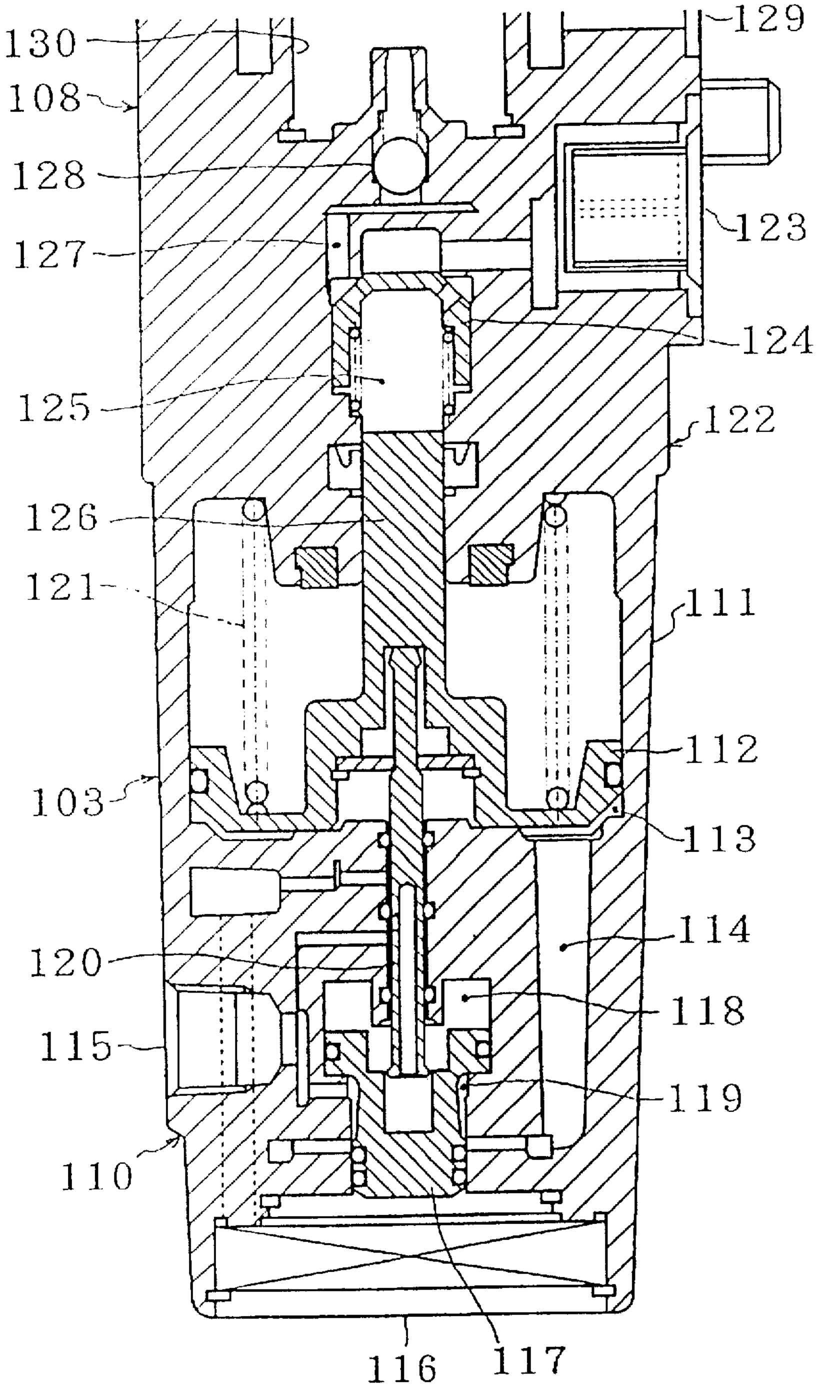
Fig.9 BACKGROUND ART
FIG. 9 is a sectional view upon pressure 0 in essential parts in a background art device.
Figure 10:
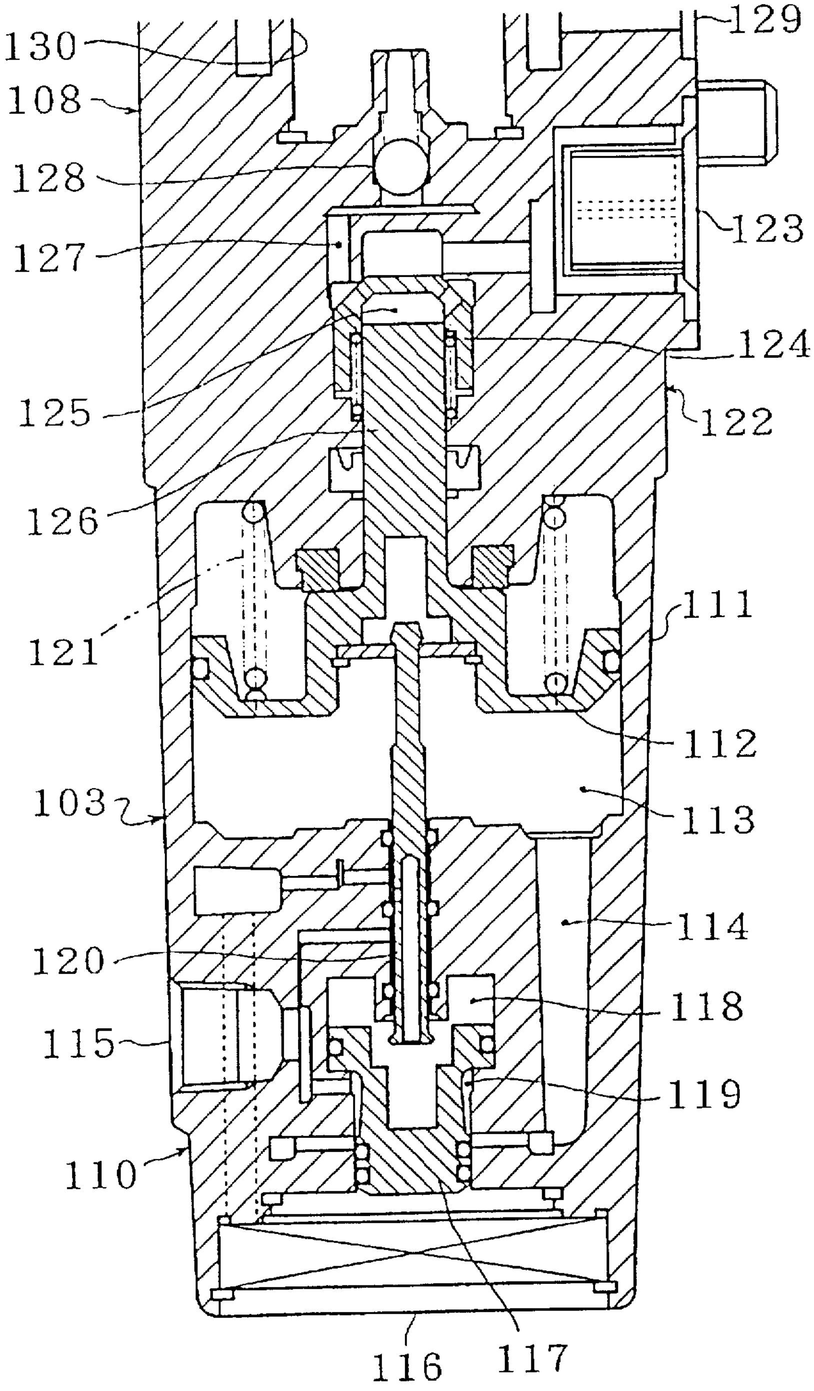
Fig.10 BACKGROUND ART
FIG. 10 is a sectional view of essential parts in the preload state in a background art device.
Figure 11:
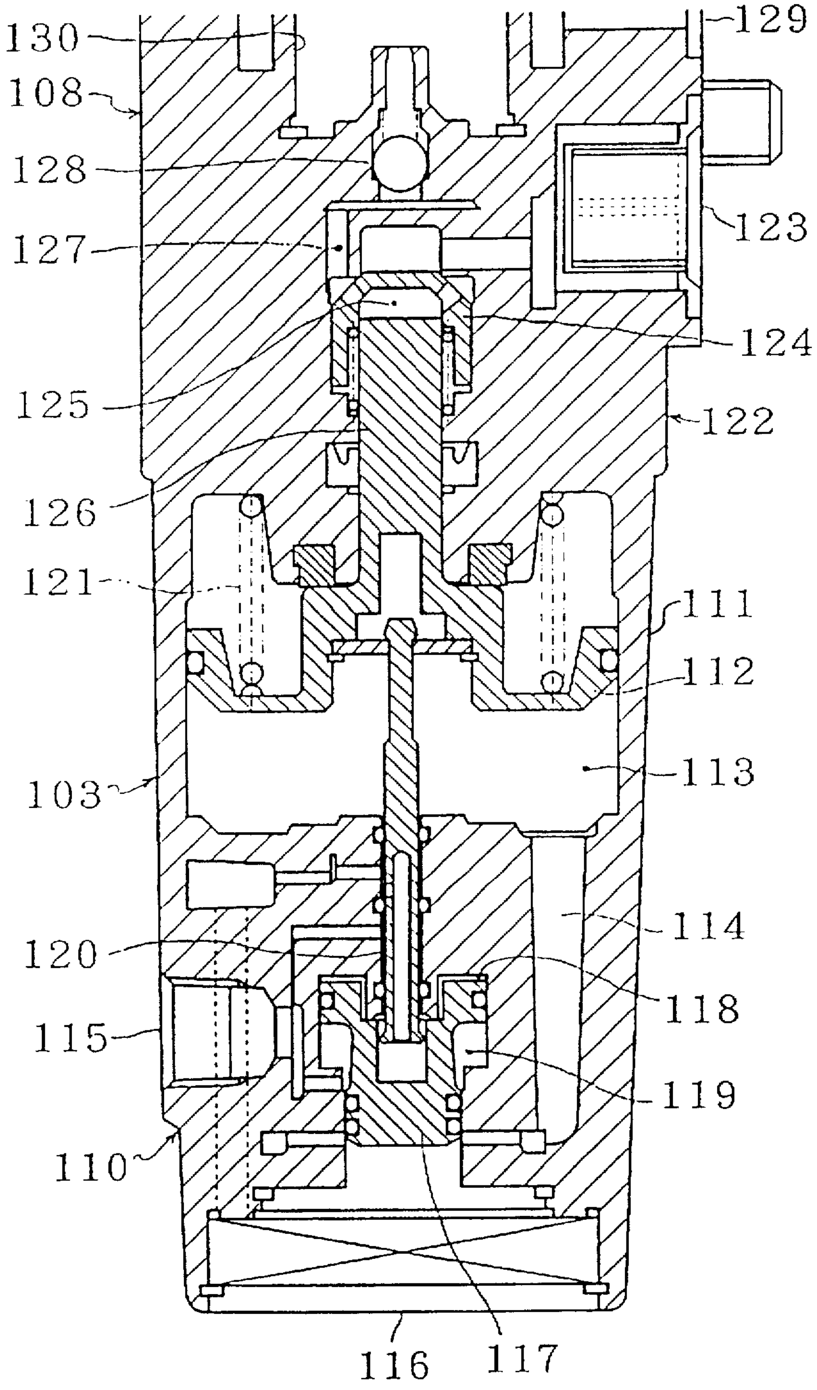
Fig.11 BACKGROUND ART
FIG. 11 is a sectional view of essential parts in a small flow rate relief state in a background prior art device.
Figure 12:
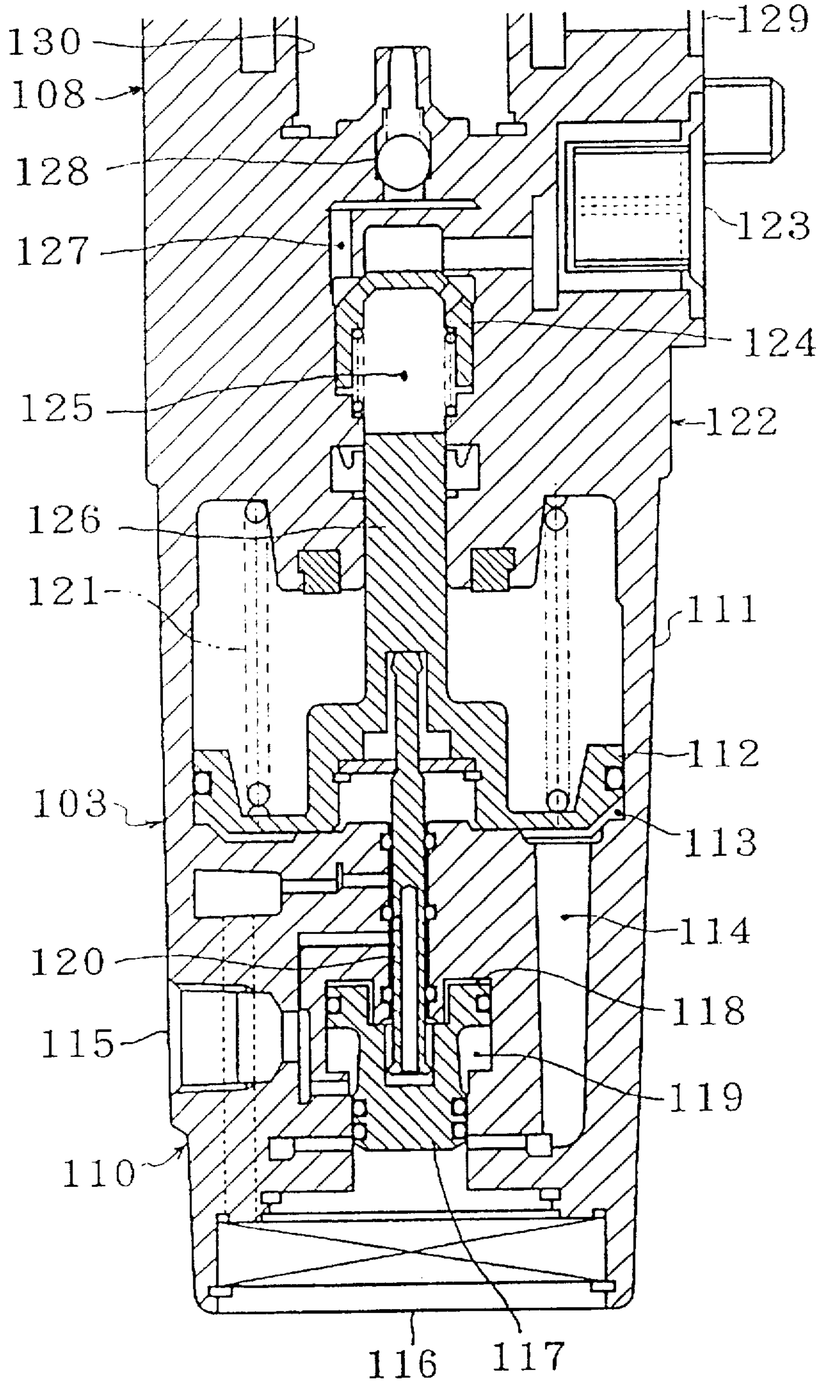
Fig.12 BACKGROUND ART
FIG. 12 is a sectional view of essential parts in a large flow rate relief state in a background art device.
Figure 13:
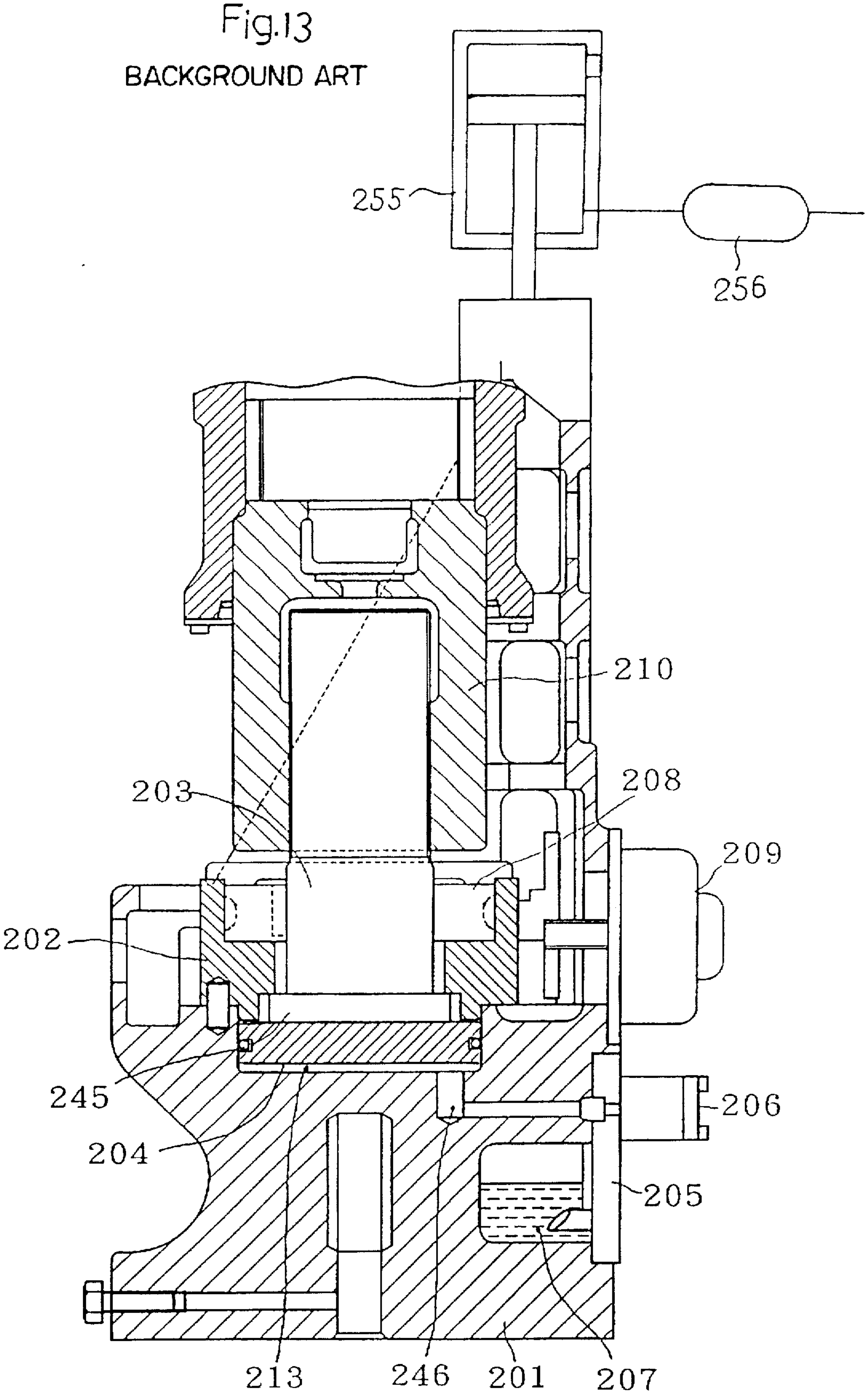
Fig.13 BACKGROUND ART
FIG. 13 is a partially cut-away side view of a slide unit of a press in a background art device.
Figure 14:
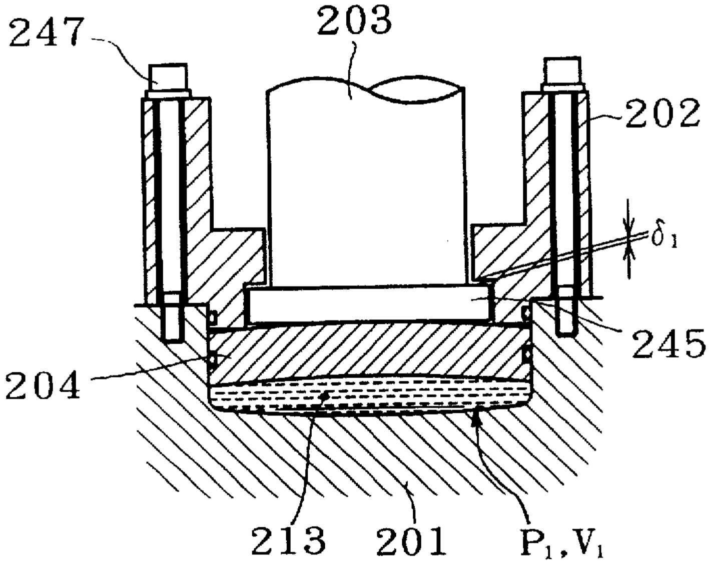
FIG. 14 is a sectional view of protector oil chamber at the preload pressure (initial state).
Figure 15:
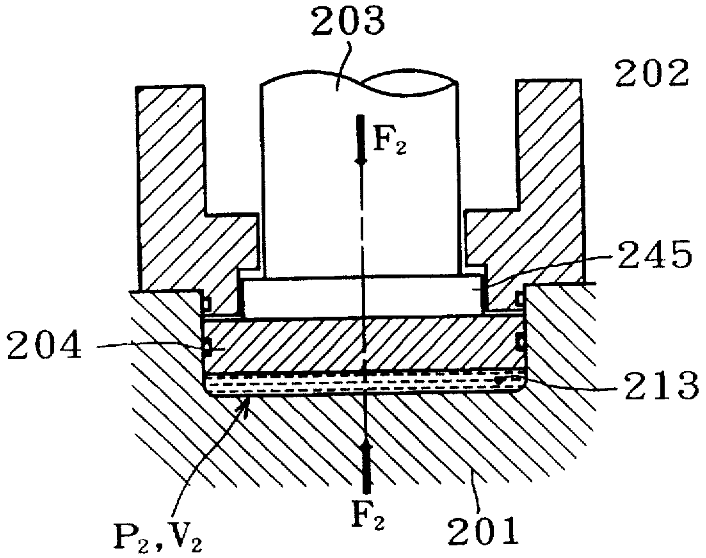
FIG. 15 is a sectional view of a protector oil chamber in press loading.
Figure 16:
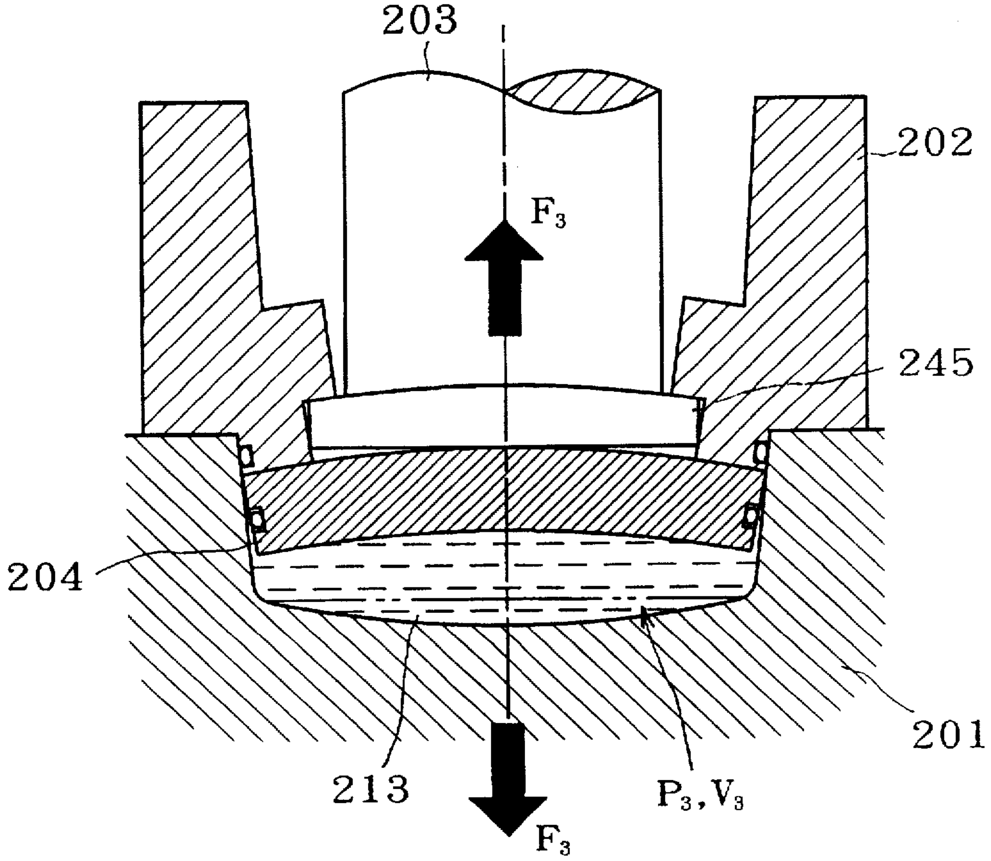

A second embodiment is shown in FIG. 5 and FIG. 6.

Figure 17:
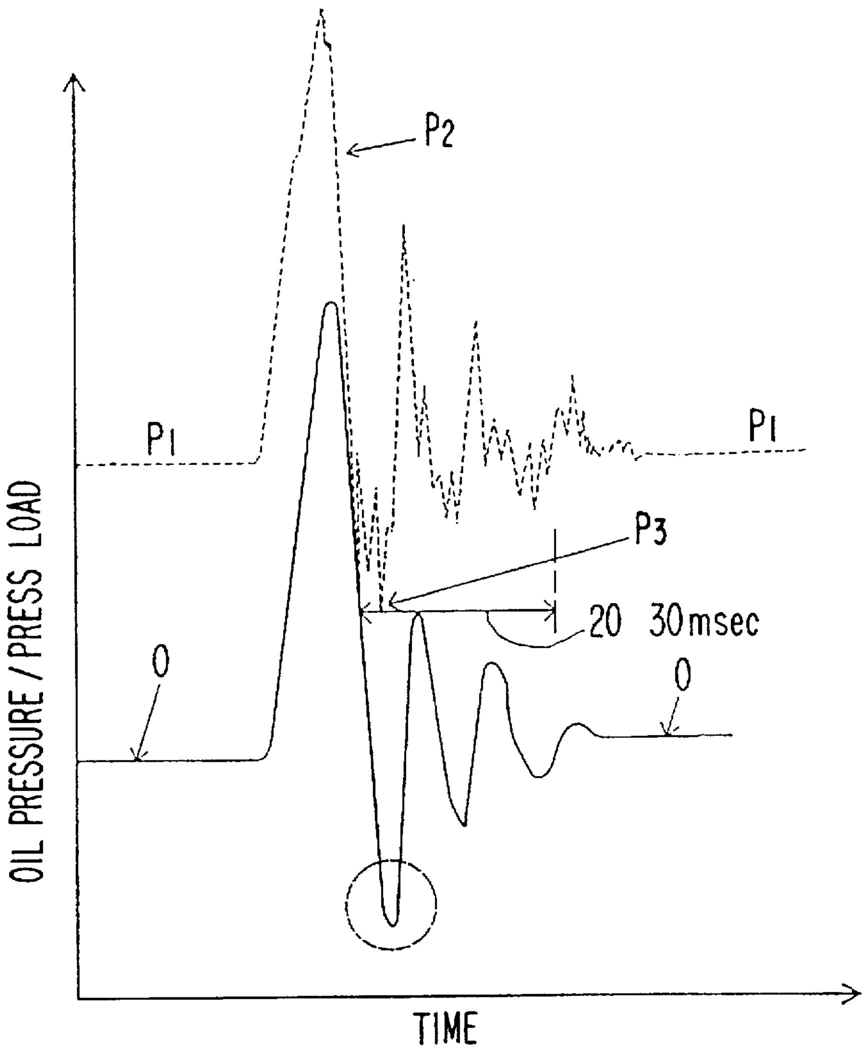
FIG. 17 is a graph showing a protector oil chamber hydraulic waveform and press loading waveform.

In the second embodiment, noticing that the time of the oil pressure in a protector oil chamber 213 falling to be under the preload pressure due to break-through loading by blanking operation is about 20 to 30 msec as shown in FIG. 17, a delay valve 214 is provided between the protector oil chamber 213 and a booster pump 211, and while the oil pressure drop is below many milliseconds, the delay valve 214 is at a position of 214*a*, and the booster pump 211 does not work, and when the oil pressure drop is many milliseconds and the delay valve 214 is at a position of 214*b*, after occurrence of an ordinary overload, pressurized oil is supplied by the booster pump 211 into the protector oil chamber 213, and hence the overload preventive device is designed not to affect the time until the press returns to ready state.

The overload preventive device of the press shown in FIG. 5 sucks working fluid from the oil tank 207 into the booster pump 211 through a feed passage 251, and supplies the pressurized oil from the booster pump 211 into the protector oil chamber 213 formed inside the slide 201 of the press through the load detecting circuit 252, and when overloaded, releases the pressurized oil into the oil tank 207 through a return oil passage 253 from the relief valve 212 connected to the load detecting circuit 252.

Reference numerals 215, 216, 217 are check valves, 218 is an overload detecting switch, 219 is an area set valve, and 206 is an overload protector device. Reference numeral 204 is a ram, 220 is a solenoid valve, and 221 is a regulator.

As a practical example of the delay valve 214, a valve having a reducing spool 231 is shown in FIG. 6.

The reducing spool 231 is disposed between a duct 238 and a duct 239 in a body 237 and is brased by a spring 241. An upper pilot chamber 235 is provided in the upper part of the spool 231. The upper pilot chamber 235 and duct 238 communicate through a narrow duct 233.

The duct 238 is connected to the booster pump 211 through a check valve 215, and the booster pump 211 is connected to the oil tank 207 through the check valve 216, and pressurized air is supplied into the booster pump 211. The duct 239 is connected to the protector oil chamber 213.

When discharging pressurized oil to the preload pressure, the pressure load is supplied into the upper pilot chamber 235 through the duct 233, and the spool 231 is pushed downward, and the duct 232 opens, thereby discharging the pressurized oil into the duct 239 through the duct 238. At this time, the larger end 231*a* of the spool 231 moves until the seal 240 abuts against the body 237.

When the pressure in the protector oil chamber 213 is pressurized at $P_2$, the pressurized oil is applied to the spool 231 at diameter 213*c*, and the reach of the pressurized oil in the upper pilot chamber 235 is delayed by the biasing force of the spring 241 because the duct 233 is narrow, and the spool 231 moves upward to be in the state shown in FIG. 6.

Afterwards, when the pressure drops below the preload pressure due to break-through load, the spool 231 is not easily lowered due to the difference of the pressure receiving area of the larger end 231*a* and diameter 231*c* and the resistance of seals 261, and the duct 238 and duct 239 do not communicate with each other if shorter than many milliseconds.

As explained herein, the overload preventive device of a press machine of the invention has a delay valve for opening when the internal pressure of the load detecting circuit is lower than the specified minimum pressure continuously for a specific time, interposed between the hydraulic pump and a load detecting circuit, and therefore, if the internal pressure of the load detecting circuit becomes a negative pressure lower than the specified minimum pressure due to sticking action or break-through load of the hydraulic cylinder, or fluctuates above and beneath the specified minimum pressure, when recovered over the specified minimum pressure within a specified time, the delay valve is not opened, and the internal pressure at the upstream side of the delay valve is maintained over the specified minimum pressure, so that the hydraulic pump will not be put into operation, thereby preventing elevation of the preload pressure due to addition of pressurized oil into the load detecting circuit from the hydraulic pump, and hence the overload preventive function is stabilized.

In the invention, if the oil pressure in the protector oil chamber drops within many milliseconds due to break-through load caused by a blanking operation of a press machine, the booster pump is not actuated, and therefore, the problems associated with the action of an overload relief valve by a pressure below the overload set pressure is avoided, while the ram deflection is constant, and the variation of gap $\delta_1$ of the points is eliminated.

Moreover, since an accumulator is not used in the invention, the press rigidity is not lowered, and the position variation at the bottom dead center is avoided.

Still further in the invention, by the effect of the delay valve, when the oil pressure in the protector oil chamber drops for more than many milliseconds, an ordinary operation is effected, so that no effect is given to the reset time (usually more than many milliseconds) until the press is ready to operate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An overload preventive device comprising:

a hydraulic pump for supplying pressurized fluid of a specified pressure to a load detecting circuit when internal pressure of the load detecting circuit is below a preload pressure, and stopping supply of said pressurized fluid to the load detecting circuit when the internal pressure of the load detecting circuit is over the preload pressure;

a relief valve for releasing the pressurized fluid in the load detecting circuit when the internal pressure of the load detecting circuit is over a specified value;

a delay valve interposed between the hydraulic pump and the load detecting circuit so as to open when the internal pressure of the load detecting circuit is lower than the preload pressure continuously over a specified time;

a valve case, said hydraulic pump, said relief valve, and said delay valve each being located within said valve case;

a pressure chamber located within said valve case, a partition wall separating said pressure chamber into an upstream chamber and a downstream chamber, said delay valve being located between said downstream chamber and a discharge valve of said hydraulic pump;

said delay valve including a movable delay valve element located within said upstream chamber, said delay valve element separating said upstream chamber into a front chamber and a rear chamber;

said delay valve element including an orifice having a predetermined diameter, said orifice allowing fluid communication between said front chamber and said rear chamber; and a spring located within said rear chamber between said delay valve element and said partition wall for biasing said delay valve element away from said partition wall.

2. The overload preventive device according to claim 1, further including a fluid passage located between said upstream chamber and said downstream chamber, wherein said delay valve element blocks the flow of fluid from said upstream chamber into said fluid passage when said delay valve element is in a first position.

3. The overload preventive device according to claim 1, further including a fluid passage located between said upstream chamber and said downstream chamber, said delay valve element blocking the flow of fluid from said upstream chamber into said fluid passage when said delay valve element is in a first position, and said delay valve element allowing the flow of fluid from said upstream chamber into said fluid passage when said delay valve element is in a second position.

4. The overload preventive device according to claim 3, wherein said orifice diameter contributes to a delay time with which said delay valve element moves from said first position to said second position.

5. The overload preventive device according to claim 1, wherein said partition wall includes an aperture having a cylindrical inner wall surface, and wherein said delay valve element includes a piston movable within said aperture along said cylindrical inner wall surface.

6. The overload preventive device according to claim 1, wherein said valve case includes a first fluid chamber and a second fluid chamber, said delay valve element blocking a flow of fluid from said first chamber into said second fluid chamber when said delay valve element is in a first position, and said delay valve element allowing the flow of fluid from said first chamber into said second chamber when said delay valve element is in a second position.

* * * * *